F. H. Manny,
Harvester Rake.

No. 98,284.    Patented Dec. 28, 1869.

Attest.
M. W. Beadle
Fred Thomas

Inventor.
F. H. Manny by
H. W. Beadle atty.

UNITED STATES PATENT OFFICE.

F. H. MANNY, OF ROCKFORD, ILLINOIS.

IMPROVED HARVESTER-RAKE.

Specification forming part of Letters Patent No. 98,284, dated December 28, 1869.

*To all whom it may concern:*

Be it known that I, F. H. MANNY, of Rockford, in the county of Winnebago and State of Illinois, have invented a new and useful Improvement in Harvester-Rakes; and I do hereby declare that the following is a full and exact description of the same, reference being had to the accompanying drawings, and to the letters of reference marked thereon.

This invention relates to an improvement in self-rakes for harvesters; and consists, mainly, in a device for cutting straws, vines, &c., which become entangled around the stem which operates the rake-head.

The details of construction and manner of operation will more fully appear hereinafter.

Figure 1:
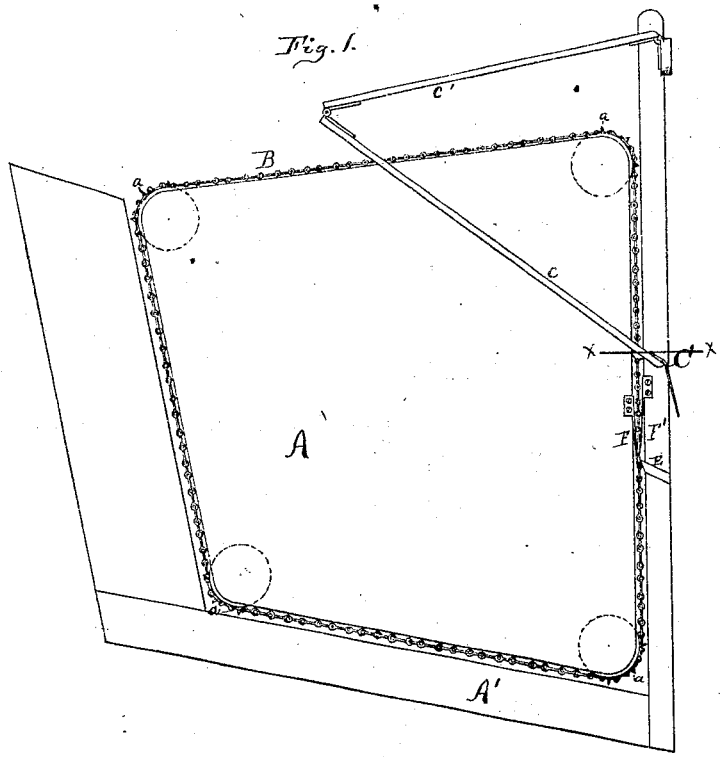
Figure 2:
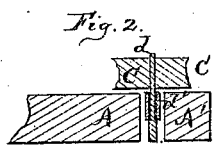
Figure 3:
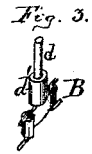

In the drawings, Figure 1 is a plan view of my invention; Fig. 2, a section through line $x\,x$, Fig. 1; and Fig. 3, a perspective view of the stem, roller, and chain.

To enable others skilled in the art to make and use my invention, I will now proceed to describe fully its construction and method of operation.

A represents the platform, which is of the usual form, and situated within the frame $A'$, and provided at each corner with the spur-wheels $a$, which carry the chain B. C represents the rake-head, which is provided with the usual hinged arms $c\,c'$, attached to the standard D. The rake-head C is attached to the chain B by means of the stem $d$, which passes upward through the bottom of the head, and is provided with the friction-roller $d'$.

It is well known that this stem, as ordinarily used, is extremely liable to become entangled with vines, straws, &c., and frequently to such an extent as to become entirely inoperative until the obstructions are removed by hand, which necessitates frequent delays, and causes great inconvenience.

I obviate this difficulty by providing the steel cutter E, which is attached to the inner side of the beam $A^2$ of the frame $A^1$, the cutting-edge thereof projecting outward, and meeting the stem $d$ just before the rake commences to gather the grain on the platform.

F represents the spring on the side of the platform A, which presses the roller of the stem $d$ close against the cutter E; while $F'$ is a spring attached to the side of the beam $A^2$, which prevents the roller $d$ from coming into too close contact therewith, and by means of both springs the roller is caused to pass close to the edge of the cutter, and all obstructions which may have become wound around it are cut off, and the rake allowed to pass freely.

Having thus fully described my invention, what I claim as new, and desire to secure by Letters Patent of the United States, is—

1. The cutter E and springs F $F'$, arranged to operate substantially as described.

2. In combination with the cutter E and springs F $F'$, the stem $d$ and friction-roller $d'$, as and for the purpose set forth.

This specification signed and witnessed this 7th day of September, 1869.

F. H. MANNY.

Witnesses:
G. W. FORD,
R. F. CRAWFORD.